Aug. 22, 1967           W. E. DYCK           3,337,320

PROCESS FOR REMOVING FLOAT GLASS CARRY-OVER ON STEEL ROLLS

Filed March 27, 1964

INVENTOR.
WALTER E. DYCK
BY
Oscar L. Spencer
ATTORNEY

United States Patent Office 3,337,320
Patented Aug. 22, 1967

3,337,320
PROCESS FOR REMOVING FLOAT GLASS CARRY-OVER ON STEEL ROLLS
Walter E. Dyck, La Vale, Md., assignor to Pittsburgh Plate Glass Company, Pittsburgh, Pa., a corporation of Pennsylvania
Filed Mar. 27, 1964, Ser. No. 355,218
2 Claims. (Cl. 65—27)

ABSTRACT OF THE DISCLOSURE

A method of steam removing the deposits of a non-uniform nature from the glass-engaging surfaces of rolls of a lehr which are exposed to the carry-over atmosphere from a chamber in which a glass sheet is formed on the surface of a bath of molten tin or tin alloy in a non-oxidizing atmosphere.

---

This application relates to the manufacture of float glass and more particularly to the virtual elimination or material reduction of a glass defect known as roll print or dross print which apparently is caused by contact of the newly-formed ribbon of glass with the lehr rolls in an annealing lehr, especially those rolls near the lehr entrance.

Float glass is produced by floating a ribbon of glass on a bath of a liquid, generally molten tin or a tin alloy, having a density above that of the glass and at a temperature at which the glass assumes a surface finish similar to a fire-polished finish. The glass is lifted from the bath of liquid and is thereafter annealed in an annealing lehr in which the glass is supported by lehr rolls generally made of stainless steel.

In order to prevent or materially reduce oxidation of the supporting liquid of the bath a non-oxidizing atmosphere is maintained over the bath in the float tank at a pressure slightly in excess of atmospheric pressure. The controlled atmosphere above the bath, slightly in excess of atmospheric pressure substantially eliminates the entrance of ambient air into the tank which would oxidize the liquid of the bath. Because of the pressures involved and structural considerations, there is a carry over of gases from the float tank into the annealing lehr. The carry over gases probably contain a tin composition which deposits on the stainless steel rolls of the annealing lehr as a crusty layer of non-uniform thickness. The glass ribbon resting on and being conveyed by crusted rotating conveying rolls becomes damaged on its lower surface. Such surface damage is known as roll print or dross print and is characterized by small vented fractures or skid marks, both visible to the naked eye which cause total rejection of the glass.

It has been found that roll print or dross print can be virtually eliminated or substantially reduced to a degree permitting use of the glass for all commercial purposes by conditioning the rolls of the annealing lehr. Such conditioning, which can be performed without interrupting the process, involves the periodic application of a hot gas at a temperature of 200° F. or above, preferably containing oxygen and moisture, to the rotating rolls. One gas which has been found suitable is steam. The pressure of the gas should be in the neighborhood of 25 pounds per square inch or above, as for example 250 pounds per square inch, and the conditioning time will vary depending upon the particular roll and its degree of crusting. Generally, the roll is conditioned until its appearance is that of metal which has been only oxidized. It has also been found desirable at times to hone the rolls as by contacting their surfaces with carborundum blocks or other abrasive blocks of a similar nature, as they are rotating. Conveniently, the honing and the conditioning can be combined, with the conditioning generally following the honing operation.

Figure 1:
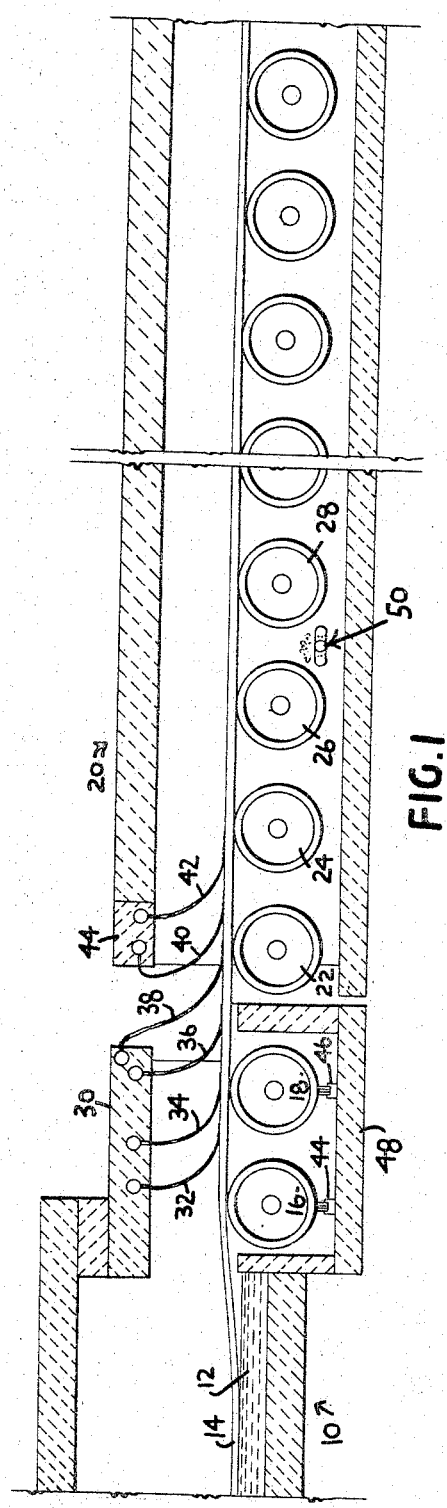
Figure 2:
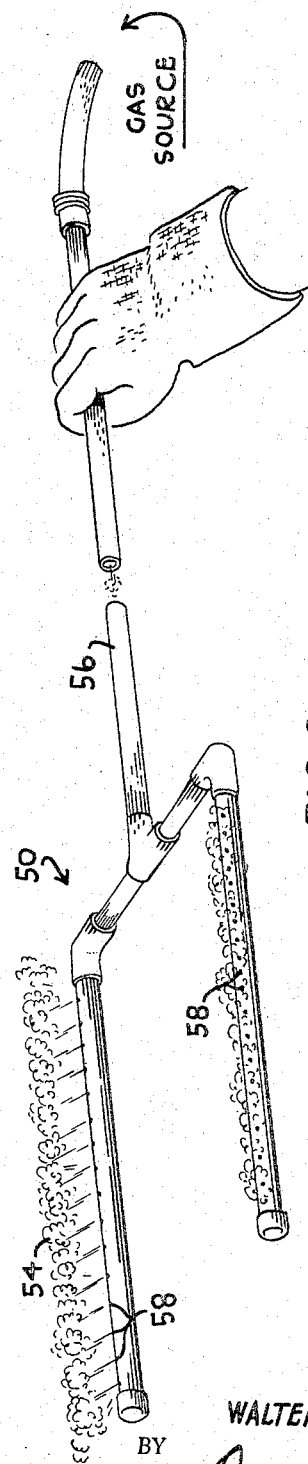

To more fully understand the inventive concept, attention is directed to the accompanying drawing in which FIGURE 1 is a partial sectional view of an apparatus for producing float glass and FIGURE 2 is a perspective view of a nozzle arrangement suitable for conditioning the rolls of the annealing lehr shown in FIGURE 1.

Looking at the drawing, in FIG. 1, there is shown a float tank 10 containing a bath of liquid 12 on which is supported a ribbon of glass 14 which has been at least surfaced in accordance with the principles of the floating process, now known in the art. A controlled atmosphere is generally maintained within the tank 10 to prevent oxidization of the liquid of the bath 12. The ribbon 14 is removed from the bath 12 at the exit end of the tank 10, by take-out rolls 16 and 18, and conveyed into an annealing lehr 20. The ribbon is conveyed through the lehr by lehr rolls 22, 24, 26, 28, etc. The take-out rolls 16, 18 and the lehr rolls 22, 24, 26, 28, etc. are all driven at a constant speed by any suitable driving means, such as gears or chains, all of which are conventional in the art.

The exit end of the tank 10 is provided with a roof structure 30 overlying the take-out rolls 16 and 18 from which curtains or drapes 32, 34, 36 and 38 are hung, these curtains being fabricated of a heat resistant fabric, such as asbestos or the like. When a glass ribbon is being taken out of the tank, the curtains or drapes drag along the top surface of the glass ribbon. The curtains or drapes serve to seal the atmosphere within the tank 10 from the entrance of ambient air.

At the entrance end of the lehr, there are curtains or drapes 40 and 42 which also drag along the surface of the glass ribbon as it enters the lehr 20. These curtains or drapes are supported by a hanger portion 44 connected to a lehr structure and are generally fabricated of the same material as the drapes 32, etc. The drapes 40 and 42 prevent erratic currents of air entering the lehr which would upset the desired annealing of the glass in accordance with known annealing practice. The glass which enters the lehr is approximately 1020–1060° F. and at the thirteenth (13th) roll, it is approximately 900–950° F.

The take-out rolls 16 and 18 engage sealing means 44 and 46, respectively, which with a box-like structure 48 serves to prevent the ambient air from entering below the ribbon at the take-out position, and also to collect any dross which is easily removed from the rolls 16 and 18. The sealing means 44 and 46 are spring biased carbon blocks resiliently urged into roll engagement.

Even with the precautions taken to prevent air entrance into the lehr, there is apparently a gaseous or other carry-over which causes uneven deposits of a material, believed to be rich in tin, on the rolls of the lehr. The rolls most generally affected are those in the entrance section of the lehr, extending to perhaps the thirteenth roll of the lehr.

As before stated the material which is formed on the lehr rolls damages the lower surface of the glass ribbon with a defect known as roll print or dross print, and by conditioning the rolls, as before described, such defect can be virtually, if not entirely, eliminated.

FIGURE 2 illustrates a tool, generally identified as 50, which has been found to be suitable for conditioning the rolls. The tool includes a U-shaped portion having legs 52 and 54 and a handle portion 56, the tool being made of pipe and various known fixtures, such as caps, elbows, T-junctures and the like. Each of the legs 52 or 54 has a plurality of holes 58 drilled through the walls angled approximately 45 degrees from a horizontal plane passing through both of the legs. The handle portion is connected to a source of pressurized gas preferably containing oxygen and water, such as steam, and the holes 58 permit the passage of the gas therethrough.

In use the tool is inserted in an opening in a side wall of the lehr 20 and is placed between a pair of lehr rolls, such as rolls 26 and 28, as illustrated in FIG. 2. The tool is moved across the lehr, so that the gas discharges against the lower halves of the lower rotating rolls and for a sufficient length of time to appear as oxidized metal and not with a dusty greyish color or a crusty appearance. Generally, there is no need to interrupt the process; conditioning can be accomplished while a glass ribbon is being annealed. Unless the temperature of the gas approximates that of the glass, care should be taken to prevent gas impingement on the glass. If such care is not taken, the glass may be broken due to the thermal differences. By so conditioning the rolls in this manner, roll print or dross print has been virtually eliminated.

*Example*

The third through thirteenth rolls of an annealing lehr were conditioned by the application of steam at a temperature of 365° F. at a pressure of 125 pounds per square inch. Before the steam was applied to the rolls, they had a dusty grey color. The steam was applied by a U-shaped nozzle having legs 12 inches long, separated approximately 4 inches, constructed of ½ inch I.D. pipe. Each leg had 20—1/16 inch diameter holes drilled on ½ inch centers along its length, the holes being at an angle of approximately 45 degrees from the horizontal. Corresponding holes in each leg defined an included angle of 90 degrees therebetween. The nozzle was inserted through an opening in the side of the lehr and between a pair of rolls, so that the steam impinged on the lower half of each roll of the pair. Care was taken to prevent impingement of the steam on the glass because of the differences in temperatures. After applying steam to the pair of rolls for approximately one hour, the dusty grey color disappeared and the rolls had an appearance similar to that of oxidized metal. The operation was repeated for each successive pair of rolls until all rolls described were conditioned. The level of the dross print after roll conditioning was materially reduced and was not visible to the human eye if it existed. The glass thereafter produced was of commercial quality.

I claim:

1. In the process of producing float glass wherein a ribbon of glass is formed on a molten metal bath of a metal selected from the group consisting of tin and tin alloys over which a non-oxidizing atmosphere is maintained, glass is removed from the bath and conveyed into an annealing lehr having steel rolls to contact and support said glass, said rolls in said lehr being subjected to a carry-over of atmosphere from said bath which atmosphere contains ingredients that form non-uniform deposits on said rolls which damage the glass being supported thereby, the improvement which comprises, directing steam at a pressure above 25 pounds per square inch and at a temperature above 200° F. against portions of said steel rolls upon which a non-uniform deposit formed by said carry-over atmosphere is present while in said lehr for a time sufficient to remove said deposits from said rolls.

2. The process of claim 1 wherein the temperature of the steam is 365° F. and the pressure of the steam is 125 pounds per square inch.

References Cited

UNITED STATES PATENTS

| 1,565,363 | 12/1925 | Henderson. | |
|---|---|---|---|
| 1,771,355 | 7/1930 | Scofield | 162—276 |
| 2,198,745 | 4/1940 | Smith | 65—27 |
| 2,209,759 | 7/1940 | Berry | 162—27 X |
| 2,243,194 | 5/1941 | Cook | 65—25 |

DONALL H. SYLVESTER, *Primary Examiner.*

F. W. MIGA, *Assistant Examiner.*